United States Patent [19]
Wollweber et al.

[11] 3,855,292

[45] Dec. 17, 1974

[54] NEW AMINOPHENYLAMIDINES, THEIR PRODUCTION AND THEIR MEDICINAL USE

[75] Inventors: Hartmund Wollweber, Wuppertal-Elberfeld, Germany; Winfried Flucke, Beenleigh, Australia

[73] Assignee: Bayer Aktiengesellschaft, Leverkusen, Germany

[22] Filed: June 9, 1971

[21] Appl. No.: 151,575

[30] Foreign Application Priority Data
June 13, 1970 Germany............................ 2029299

[52] U.S. Cl... 260/564 RF, 260/239 B, 260/293.75, 260/293.79, 260/326.86, 260/465 E, 260/501.14, 424/244, 424/267, 424/274, 424/304, 424/316, 424/326
[51] Int. Cl.......................................... C07c 123/00
[58] Field of Search.................. 260/564 RF, 501.14

[56] References Cited
UNITED STATES PATENTS
3,189,648  6/1965  Gerjovich....................... 260/564 R
3,182,053  5/1965  Steiger........................... 260/564 R
3,557,128  1/1971  Pallos et al..................... 260/564 R

OTHER PUBLICATIONS

Larizza et al., J. Org. Chem., Vol. 29, pp. 3697–3700 (1964).

*Primary Examiner*—Leon Zitver
*Assistant Examiner*—Gerald A. Schwartz

[57] ABSTRACT

4-Amino substituted phenylamidine are anthelmintics. The compounds, of which N-(4-aminophenyl)-N',N'-dimethylacetamidine is a representative embodiment, can be prepared through treatment of a 4-amino aniline with a carboxylic acidamide or thioamide, reduction of an appropriately substituted 4-aminophenylamidine, optionally followed by alkylation of the resultant 4-aminophenylamidine, formation of a Schiff base followed by quarternization and hydrolysis, or hydrolysis of a 4-acylaminophenylamidine.

6 Claims, No Drawings

NEW AMINOPHENYLAMIDINES, THEIR PRODUCTION AND THEIR MEDICINAL USE

DETAILED DESCRIPTION

The present invention relates to new aminophenylamidines and -cycloamidines and salts thereof, to processes for their production, and to their use as medicines, especially as parasiticides.

Acylaminophenylformamidines, such as N-(p-acetamidophenyl)-N',N'-dimethylformamidine (U.S. Pat. No. 3,184,482) are already known. This compound, as well as other formamidine derivatives, are, however, ineffective against helminths. Furthermore, N-phenylacetamidines, such as N-(p-chlorophenyl)-N',N'-dimethylacetamidine, are known. These compounds are also ineffective against helminths.

This invention provides aminophenylamidines and aminophenylcycloamidines of the general formula:

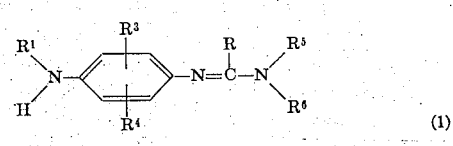

(1)

in which:
- $R^1$ is a hydrogen atom or a straight- or branched-chain alkyl, alkoxy alkyl or alkenyl group;
- $R^3$ and $R^4$ are the same or different and are each a hydrogen, fluorine, chlorine or bromine atom or a straight- or branched-chain alkyl, alkenyl, or alkoxy group or a cyano or trifluoromethyl group;
- $R^6$ is a straight- or branched-chain alkyl or alkenyl group or a cycloalkyl group; and either
- R is a straight- or branched-chain alkyl, alkenyl or alkoxy group; and
- $R^5$ is a hydrogen atom or a straight- or branched-chain alkyl, alkenyl, alkynyl or alkoxy group; or
- R and $R^5$ together with the amino nitrogen atom and the amidino carbon atom form a five, six or seven-membered ring;

and their salts.

These aminophenylamidines and -cycloamidines and their non-toxic salts are useful for combating parasites, especially helminths, in human and veterinary medicine.

Alkyl and alkoxy groups R preferably contain 1 to 5, especially 1 or 2, carbon atoms, and the alkenyl group R preferably contains 2 to 5 carbon atoms.

Alkyl groups $R^1$ preferably contain 1 to 5, most preferably 1 or 2, carbon atoms, and alkenyl groups $R^1$ generally contain 2 to 5, preferably 2 or 3, carbon atoms.

Alkyl and alkoxy groups $R^3$ and $R^4$ preferably contain 1 to 6, especially 1 to 3, carbon atoms, and alkenyl groups $R^3$ and $R^4$ preferably contain 2 to 6, especially 2 to 4, carbon atoms.

Alkyl and alkoxy groups $R^5$ preferably contain 1 to 4, especially 1 to 3, carbon atoms. The alkenyl and alkynyl groups $R^5$ preferably contain 2 to 4 carbon atoms.

If R and $R^5$ together with the amine nitrogen atom form a 5-membered to 7-membered ring, R and $R^5$ together preferably represent the group $-(CH_2)_n-$, in which n represents 3, 4 or 5.

The alkyl groups $R^6$ preferably contain 1 to 5, especially 1 to 3, carbon atoms, and the alkenyl groups $R^6$ preferably contain 2 to 5, especially 2 or 3, carbon atoms. The cycloalkyl group $R^6$ preferably possesses 3 to 7 carbon atoms.

The active substances according to the invention are basic in character. They can be used as free bases or in the form of their salts, i.e., salts of pharmaceutically acceptable acids for example hydrohalides, such as, for example, hydrochlorides, sulphates, phosphates, nitrates, acetates, naphthalene disulphonates or pamoates, i.e., the salts with methylene-bis-(2-hydroxynaphthoic acid-3). The preferred salts are the hydrochlorides.

Particularly preferred compounds are those of the general formula (1) in which:
- $R^1$ is a hydrogen atom or an alkyl or alkylene group containing up to three carbon atoms;
- $R^3$ is a hydrogen, chlorine or bromine atom or a methyl or cyano group;
- $R^4$ is a hydrogen, chlorine or bromine atom or an alkyl group with up to three carbon atoms or a methoxy, trifluoromethyl or cyano group;
- $R^6$ is methyl or ethyl group; and either
- R is a methyl or ethyl group or a cycloalkyl group with 3 to 6 carbon atoms; and
- $R^5$ is an alkyl or alkoxy group with 1 to 3 carbon atoms;

or
- R and $R^5$ together are a $-(CH_2)_m-$ group, m being a whole number from 3 to 5;

and their salts.

The invention further provides four processes designated as (a), (b), (c) and (d) for the production of the new aminophenylamidines and -cycloamidines and their salts.

Process (a) comprises reacting an aniline derivative of the general formula

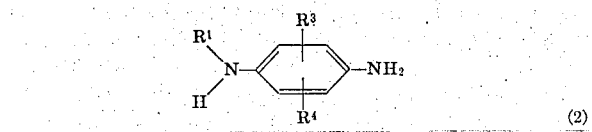

(2)

with a carboxylic acid amide or thioamide of the general formula:

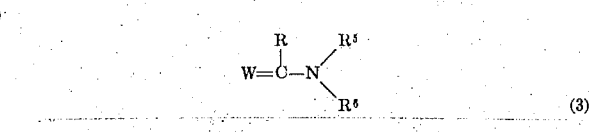

(3)

or with a salt or a reactive derivative thereof. In general formulae (2) and (3) W is an oxygen or sulphur atom and R, $R^1$ and $R^3$ to $R^6$ are as defined above.

The reaction is optionally carried out in the presence of a condensation agent. The reaction product can be isolated in the form of one of its salts or in the form of a free base, and then optionally converted into any other desired salt.

As salts of the carboxylic acid amides (3) there are to be understood both salts with organic acids, (for example, the acetates) and salts with inorganic acids (for example the hydrohalides or sulphates).

By reactive derivatives of the amides (3) there are, for example, to be understood derivatives which are obtained by reaction of an amide or thioamide of the general formula (3) with an inorganic acid (for example, hydrochloric acid, boron trichloride or sulphuric acid) or with an inorganic or organic acid halide (for example, phosphorus oxychloride, phosphorus pentachloride, phosgene, thionyl chloride, benzoyl bromide, p-toluenesulphonyl chloride or a mixture of phosgene/aluminium chloride, or phosgene/hydrogen chloride or phosgene, phosphorus oxychloride) or with a trialkyloxonium fluorborate (1 – 5 carbon atoms per alkyl group) or with a dialkyl sulphate (1 – 5 carbon atoms per alkyl group) or an alkyl halide (1 – 5 carbon atoms).

As condensation agents that can be employed in process (a), there may for example be mentioned:

Inorganic acids (for example, hydrochloric acid, boron trichloride, sulphuric acid) or inorganic or organic acid halides (for example phosphorus oxychloride, phosphorus pentachloride, phosgene, thionyl chloride, benzoyl bromide, p-toluenesulphonyl chloride or a mixture of phosgene/aluminium chloride, or phosgene/hydrogen chloride or phosgene/phosphorus oxychloride) or trialkyloxonium fluorborates (1 to 5 carbon atoms per alkyl group) or dialkyl sulphates (1 to 5 carbon atoms per alkyl group) or alkyl halides (1 to 5 carbon atoms).

When a thioamide is used, i.e. W = sulphur in general formula (3), a desulphurizing agent, for example, $HgO$, $Ag_2O$ or $Hg(CN)_2$ can be used advantageously in addition to one of the abovementioned condensation agents, or without one of these condensation agents.

The reaction components (2) and (3) are preferably employed in the stoichiometrically required amounts.

The reaction can be carried out in any inert organic solvent; among such solvents, aromatic, optionally halogenated, hydrocarbons, for example, benzene, toluene or dichlorobenzene; optionally chlorinated aliphatic hydrocarbons, for example methylene chloride and chloroform; tetramethylene-sulphone, and lower aliphatic alcohols, for example, methanol and ethanol, should be mentioned.

The reactants are preferably brought together at room temperature (about 20°C) and, if appropriate, are warmed to between 30° and 150°C, preferably 80° to 120°C, in order to complete the reaction.

The success of the reaction does not depend on the sequence in which the reactants are brought together. The new compounds are isolated in the customary manner.

Process (b) comprises reducing a nitrophenylamidine or -cycloamidine of the general formula:

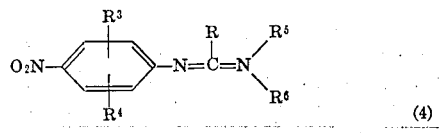

(4)

or a salt thereof, to obtain an aminophenylamidine or -cycloamidine, of the general formula:

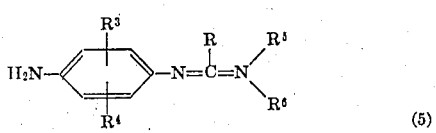

(5)

i.e. a compound of general formula (1) in which $R^4$ is hydrogen. This product is then, if a compound of general formula (1) is required in which $R^1$ is not hydrogen, either i. alkylated with an alkylating agent of the general formula $$B - R^7$$

(6), or ii. alkylated reductively with an oxo compound of the general formula:

(7)

to obtain a Schiff base which is reduced to give the required aminophenylamidine, -cycloamidine or salt.

In the above general formulae (4), (6) and (7), R, $R^1$, $R^3$ to $R^6$ are as defined above, B is a reactive ester group or a halogen atom; $R^7$ is a straight-chain or branched alkyl or alkenyl group; $R^8$ is a hydrogen atom or an alkyl group: and $R^9$ is an alkyl group.

Straight-chain or branched alkyl groups $R^7$ preferably contain 1 to 5 carbon atoms, especially 1 or 2 carbon atoms.

Halogen atoms B are preferably chlorine or bromine atoms. Reactive ester groups B are, for example, arylsulphonyloxy, for example, benzenesulphonyloxy or tosyloxy, or alkylsulphonyloxy, for example methanesulphonyloxy, or alkoxysulphonyloxy (preferably with 1 or 2 carbon atoms in the alkyl or alkoxy group).

The alkyl groups $R^8$ preferably contain 1 to 5, especially 1 to 4, carbon atoms and the alkyl groups $R^9$ preferably contain 1 to 5, especially 1 or 2, carbon atoms.

The nitrophenylamidines of general formula (4) and their salts can be reduced by any suitable method.

The reduction can advantageously be effected catalytically, for example with Raney nickel as the catalyst, optionally in the presence of a solvent, such as an alcohol, for example methanol or ethanol, a solution of hydrochloric acid in ethanol, or an ether for example tetrahydrofuran, at a temperature of 0° to 100°C, preferably of 20° to 80°C, optionally under pressure, for example at 1 to 100, preferably 60 to 80, atmospheres gauge.

The reduction can also be carried out with zinc/hydrochloric acid and stannous chloride, preferably in an aqueous medium (water).

Furthermore, the reduction can be carried out with sodium sulphide, for example in an alcohol, for example, methanol and ethanol, or in an ether, for example, in tetrahydrofurane, at temperatures of 20° to 100°C, preferably at the boiling point of the solvent.

Further reducing agents which can be used are complex metal hydrides, such as, for example, sodium boranate in alcohol (preferably ethanol)/water, at temperatures of, preferably, 20° to 80°C.

In process b (i) 1 to 2 mols of the alkylating agent of general formula (6) are preferably employed per mol of the intermediate compound (5).

Examples of suitable solvents for use in step (i) are water, alcohols, for example, methanol or ethanol, ketones acetone for example, acetone, ethers for example, tetrahydrofuran, aromatic hydrocarbons, for example, benzene or toluene, or mixtures of these solvents. An increase in the yields can be achieved by the addition of auxiliary bases such as, for example, sodium hydroxide, sodium and potassium carbonate, pyridine or triethylamine.

The reaction is carried out at 0°– 100°C, preferably at 10° to 40°C.

In process b (ii) the reactants (5) and (7) are preferably employed in approximately molar amounts. Solvents which can be used for this reaction, which is carried out at 0° to 100°C, preferably at about 20° to 60°C, are, for example, alcohols, for example, methanol or ethanol ethers for example, tetrahydrofuran, and aromatic hydrocarbons, for example, benzene or toluene. The Schiff's base obtained in this manner is hydrogenated, optionally being isolated, by any suitable method. For instance, the base may be catalytically hydrogenated, for example with Raney nickel as the catalyst. The catalytic reduction is preferably carried out at room temperature (about 20°C), and optionally under pressure (1 to 80 atmospheres gauge, preferably 60 atmospheres gauge). As a solvent an alcohol, for example methanol and ethanol, an aromatic hydrocarbon, for example, benzene and toluene, or an ether, for example, tetrahydrofuran, can be used.

The reduction of the Schiff's base can also be effected by means of a complex metal hydride (approximately stoichiometrically required amounts) for example, sodium borohydride. In this case the reaction is carried out at temperatures of 20° to 80°C. Here, alcohols, for example methanol and ethanol, optionally in admixture with water, are preferably used as solvents.

Process (c) comprises reacting an aminophenylamidine or -cycloamidine of the general formula:

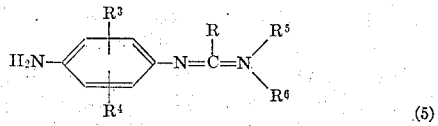

i.e. a compound of the general formula (1) in which $R^1$ is hydrogen, with an aliphatic or aromatic aldehyde to obtain a Schiff base quaternising the Schiff base with an alkylating agent of the general formula:

$$B - R^7 \quad (6)$$

and subsequently hydrolytically splitting off the aldehyde portion of the product. If a salt is required this is then produced in any suitable manner.

In general formulae (5) and (6), R, $R^3$ to $R^7$ and B are as defined above.

In process (c), the compound of the general formula (5) is reacted with any suitable aldehyde, for example, acetaldehyde or benzaldehyde, according to any suitable method, to give the Schiff base. The reactants are preferably employed in molar amounts. The reaction temperatures are preferably between 0° and 80°C, preferably between 20° and 40°C. Any inert organic solvent may be used, for instance, an alcohol, for example methanol and ethanol, an aromatic hydrocarbon, for example benzene and toluene, or an ether for example, tetrahydrofuran.

The Schiff base is quaternised, optionally after being isolated, by means of the alkylating agent (6) by any suitable method, preferably at temperatures between 20° to 100°C, especially between 60° to 80°C. Any inert organic solvent for example benzene, toluene and tetrahydrofurane can be employed. The subsequent hydrolysis is preferably carried out without isolation of the quaternised Schiff base, preferably at temperatures between 20° to 100°C, especially between 40° and 90°C, and preferably in an aqueous alcohol, especially ethanol.

Process (d) comprises hydrolytic splitting of an acylaminophenylamidine or -cycloamidine of the general formula:

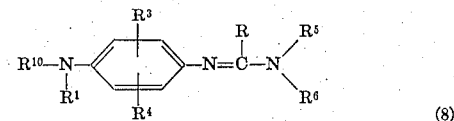

in which R, $R^1$ and $R^3$ to $R^6$ are as defined above and $R^{10}$ is an acyl or acyloxy group, preferably with 1 – 5 carbon atoms.

The hydrolytic splitting is carried out by any suitable method; many such methods are known in the art.

The hydrolysis is preferably carried out in the presence of a strong acid, such as hydrochloric acid or sulphuric acid. Water, or a mixture of water with an alcohol, is used as a solvent. The hydrolysis is preferably carried out at the boiling point of the solvent.

The following Examples illustrate the process according to the invention for the production of the new aminophenylamidines and cycloamidines.

All temperatures are given in degrees centigrade (°C).

All starting compounds are known or are obtainable by known processes.

EXAMPLE 1

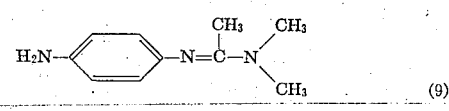

620 g (3 mols) of N-(4-nitrophenyl)-N',N'-dimethylacetamidine in 1250 ml of ethanolic hydrochloric acid (3.3 mols) are hydrogenated with the aid of Raney nickel as the catalyst, at 70° – 80° and 80 to 100 atmospheres gauge hydrogen pressure. The mixture is evaporated in vacuo, the residue is taken up in water and rendered alkaline with sodium hydroxide solution, the base which separates out is extracted with ether, the extract is evaporated, and the residue is distilled in vacuo; the product is N-(4-aminophenyl)-N',N'-dimethylacetamidine, boiling point $_{0.2}$ 158° – 165°, melting point 93° – 95° (from ethyl acetate); yield 426.5 g, monohydrochloride, melting point 273° – 274°.

The following compounds are obtained by analogous processes:

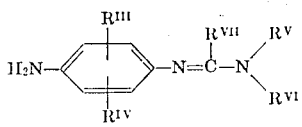
(10)

23 g of isobutyraldehyde are added dropwise, at 20°, to 53 g (0.3 mol) of N-(4-aminophenyl)-N',N'-dimethylacetamidine, dissolved in 500 ml of benzene, the mixture is heated for 7 hours whilst connected to a water separator, and the N-(4-isobutylideneaminophenyl)-N',N'-dimethylacetamidine is distilled in vacuo; boiling point $_{0.3}$ 156°–160°. 8.3 g (0.066 mol) of dimethyl sulphate are added to 13 g (0.056 mol) of this compound, dissolved in 150 ml of benzene, the mixture is heated for 1 hour under relufx, the benzene is decanted off, the residue is taken up in 50 ml of 50% strength ethanol, and the mixture is heated for one hour under reflux. After evaporation in vacuo, and treatment of the residue with sodium hydroxide solution, the free base is extracted with ether and distilled: boiling point $_{0.5}$ 155°–160°, hydrochloride, melting point 226°–228°.

| H₂N | R$^{III}$ | R$^{II}$ | R$^{V}$ | R$^{VI}$ | R$^{VII}$ | Boiling point/mm Hg |
|---|---|---|---|---|---|---|
| 4-NH₂ | H | 2-Cl | CH₃ | CH₃ | CH₃ | 172°/0.3 |
| 4-NH₂ | H | 3-Cl | CH₃ | CH₃ | CH₃ | 170°/0.3 |
| 4-NH₂ | 2-Cl | 6-Cl | CH₃ | CH₃ | CH₃ | 190°/0.5 |
| 4-NH₂ | H | 2-CH₃ | CH₃ | CH₃ | CH₃ | 175°/0.6 |
| 4-NH₂ | H | 2-OCH₃ | CH₃ | CH₃ | CH₃ | 180°/0.4 |
| 4-NH₂ | H | 2-CF₃ | CH₃ | CH₃ | CH₃ | 173°/0.3 |
| 4-NH₂ | H | 2-CN | CH₃ | CH₃ | CH₃ | 168°/0.2 |
| 4-NH₂ | 2-CN | 6-CN | CH₃ | CH₃ | CH₃ | 184°/0.3 |
| 4-NH₂ | H | 2-Br | CH₃ | CH₃ | CH₃ | 185°/0.4 |
| 4-NH₂ | H | 2-C₃H₇ | CH₃ | CH₃ | CH₃ | 183°/0.4 |
| 4-NH₂ | H | H | CH₃ | CH₃ | C₂H₅ | 166°/0.3 |
| 4-NH₂ | H | H | CH₃ | CH₃ | C₃H₇ | 174°/0.3 |
| 4-NH₂ | H | H | CH₃ | C₂H₅ | CH₃ | 171°/0.3 |
| 4-NH₂ | H | H | CH₃ | C₃H₇ | CH₃ | 178°/0.3 |
| 4-NH₂ | H | H | C₂H₅ | C₂H₅ | CH₃ | 180°/0.3 |
| 4-NH₂ | H | H | H | CH₃ | CH₃ | 154°/0.2 |
| 4-NH₂ | H | H | H | C₂H₅ | CH₃ | 160°/0.2 |
| 4-NH₂ | H | H | C₃H₇ | CH₃ | 168°/0.2 | |
| 4-NH₂ | H | H | H | H | CH₃ | |
| 4-NH₂ | H | H | CH₃ | OCH₃ | CH₃ | 163°/0.2 |
| 4-NH₂ | H | H | CH₃ | OC₂H₅ | CH₃ | 168°/0.2 |
| 4-NH₂ | 2-Cl | H | CH₃ | OCH₃ | CH₃ | 175°/0.2 |

EXAMPLE 2

The following compounds are produced in accordance with the method described in Example 1, by reduction of 2-(nitro-phenylimino)-azacycloalkanes:

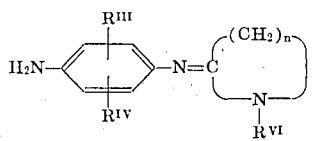
(11)

| n | H₂N | R$^{III}$ | R$^{IV}$ | R$^{VI}$ | Boiling point/mm Hg |
|---|---|---|---|---|---|
| 3 | 4-NH₂ | H | H | CH₃ | 170°/0.1 Melting point 85–86° |
| 3 | 4-NH₂ | 2-Cl | H | CH₃ | Melting point 91–92° |
| 3 | 4-NH₂ | 2-CH₃ | H | CH₃ | 190°/0.1 |
| 3 | 4-NH₂ | 2-Br | H | CH₃ | 205°/0.1 |
| 3 | 4-NH₂ | 3-Cl | H | CH₃ | 193°/0.2 |
| 3 | 4-NH₂ | 3-CH₃ | H | CH₃ | 192°/0.1 |
| 3 | 4-NH₂ | 2-Cl | 6-Cl | CH₃ | 210°/0.2 |
| 3 | 4-NH₂ | 2-CN | H | CH₃ | 181°/0.2 |
| 3 | 4-NH₂ | H | H | C₂H₅ | 174°/0.2 |
| 3 | 4-NH₂ | 2-Cl | H | C₂H₅ | 188°/0.1 |
| 4 | 4-NH₂ | H | H | CH₃ | 178°/0.1 |
| 4 | 4-NH₂ | 2-Cl | H | CH₃ | 196°/0.1 |
| 5 | 4-NH₂ | 2-Cl | H | CH₃ | 203°/0.1 |
| 5 | 4-NH₂ | H | H | CH₃ | 193°/0.1 |
| 3 | 4-NH₂ | H | H | H | 178°/0.2 |
| 3 | 4-NH₂ | 2-CF₃ | H | CH₃ | Melting point 182°/0.2 |

EXAMPLE 3

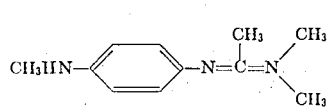
(12)

The following compounds are produced by analogous processes:

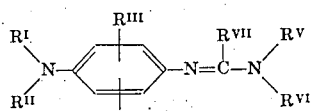
(13)

| R''R'N | R''' | R'' | R' | R^{IV} | R^{VII} | Boiling point/ mm Hg |
|---|---|---|---|---|---|---|
| 4-H$_3$C-HN | 2-Cl | H | CH$_3$ | CH$_3$ | CH$_3$ | 170°/0.5 |
| 4-H$_3$C-HN | 2-Br | H | CH$_3$ | CH$_3$ | CH$_3$ | 178°/0.5 |
| 4-H$_5$C$_2$-HN | 2-Cl | H | CH$_3$ | CH$_3$ | CH$_3$ | 172°/0.2 |
| 4-H$_5$C$_2$-HN | H | H | CH$_3$ | CH$_3$ | CH$_3$ | 163°/0.5 |
| 4-H$_7$C$_3$-HN | H | H | CH$_3$ | CH$_3$ | CH$_3$ | 171°/0.6 |
| 4-(CH$_3$)$_2$HC-HN | H | H | CH$_3$ | CH$_3$ | CH$_3$ | 169°/0.6 |
| 4-H$_3$C-HC=HC-CH$_2$-HN | H | H | CH$_3$ | CH$_3$ | CH$_3$ | 178°/0.4 |
| 4-H$_3$C-HN | H | H | CH$_3$ | OCH$_3$ | CH$_3$ | 162°/0.4 |
| 4-H$_3$C-HN | 2-Cl | H | CH$_3$ | OCH$_3$ | CH$_3$ | 178°/0.6 |
| 4-CH$_3$O-CH$_2$-CH$_2$-HN | H | H | CH$_3$ | CH$_3$ | CH$_3$ | 180°/0.2 |

EXAMPLE 4

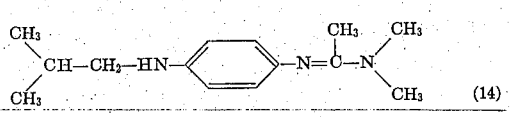

(14)

35 g of the N-(4-isobutylideneaminophenyl)-N',N'-dimethylacetamidine obtained according to Example 3, dissolved in 250 ml of tetrahydrofurane, are hydrogenated with Raney nickel as the catalyst, at 20° – 50° and 60 atmospheres gauge of hydrogen. After filtering off the catalyst, and distilling, 17.5 g of N-(4-isobutylaminophenyl)-N',N'-dimethylacetamidine, boiling point $_{0.3}$ 1382 –145°, are obtained.

EXAMPLE 5

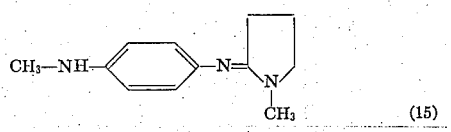

(15)

Successive reaction of 2-(4-aminophenyl)-imino-N-methylpyrrolidine with benzaldehyde and dimethyl sulphate, in accordance with the method described in Example 3, yields 2-(4-methylaminophenyl)-imino-N-methylpyrroline, boiling point $_{0.2}$ 175°.

The following compounds are produced in a corresponding way:

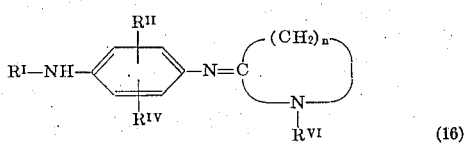

(16)

| n | R'-NH | R''' | R'' | R^{VI} | Boiling point/ mm Hg |
|---|---|---|---|---|---|
| 3 | 4-CH$_3$-NH | 2-Cl | H | CH$_3$ | 191°/0.2 |
| 3 | 4-C$_2$H$_5$-NH | 2-Cl | H | CH$_3$ | 198°/0.2 |
| 3 | 4-C$_2$H$_5$-NH | H | H | CH$_3$ | 183°/0.3 |
| 3 | 4-CH$_3$-NH | H | H | C$_2$H$_5$ | 186°/0.2 |
| 3 | 4-CH$_3$-NH | 2-Cl | H | C$_2$H$_5$ | 198°/0.1 |
| 4 | 4-CH$_3$-NH | H | H | CH$_3$ | 183°/0.3 |
| 4 | 4-CH$_3$-NH | 2-Cl | H | CH$_3$ | 202°/0.2 |
| 5 | 4-CH$_3$-NH | 2-Cl | H | CH$_3$ | 212°/0.1 |
| 5 | 4-CH$_3$-NH | H | H | CH$_3$ | 196°/0.2 |

EXAMPLE 6

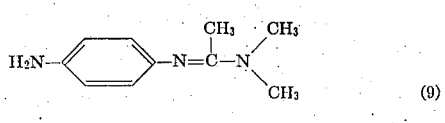

(9)

25 g of N-(4-carbethoxyaminophenyl)-N',N'-dimethylacetamidine in 100 ml of concentrated hydrochloric acid are heated for 2 hours under reflux. After evaporation, the residue is taken up in water and rendered alkaline with sodium hydroxide solution, and the aqueous phase is extracted with a mixture of ether and chloroform. After distillation, 12 g of N-(4-aminophenyl)-N',N'-dimethylacetamidine, boiling point $_{0.2}$ 158°–165°, melting point 93°–95°, are obtained.

The fact that the new aminophenylamidines and cycloamidines and their salts show a strong and wide-ranging anthelmintic activity is surprising and unforeseeable.

The new compounds are substantially more effective than other known anthelmintics of the same general action, such as, for example, bephenium hydroxynaphthoates, 1,4-phenylene-diisothiocyanate, perchloroethylene, thiabendazole and parbendazole.

Special attention is drawn to the fact that excellent results are achieved with a single administration of the new compounds.

The provision by the invention of these new compounds constitues a substantial extension of the available range of anthelmintics.

In particular, the compounds manufactured according to the invention for example display a surprisingly good and broad action against the following helminths (nematodes and cestodes):

I. Nematodes

1. *Ancylostoma caninum, Uncinaria stenocephala* and *Bunostomum trigonocephalum* (hookworms) from the family of the Ancylostomatidae;

2. *Haemonchus contortus, Trichostrongylus colubriformis, Cooperia punctata, Ostertagia circumcincta, Nippostrongylus muris* and *Nematospiroides dubius* (worms of the stomach and small intestine) from the family of the Trichostrongylidae; 3. *Oesophagostomum columbianum* and *Chabertia ovina* (worms of the large intestine) from the family of the Strongylidae;

4. *Strongyloides ratti* (dwarf threadworms) from the family of the Rhabditidae;

5. *Toxocara canis, toxascaris leonina* and *Ascaris summ* larvae (coilworms) from the family of the Ascarididae;

6. *Aspiculuris tetraptera* (maggot worms) from the family of the Oxyuridae;

7. *Heterakis spumosa* from the family of the Heterakidae;

II. Cestodes.

1. *Hymenolepis nana* and *Hymenolepis microstoma* (tapeworms) from the super-family of the Taenioidea.
The action of the new compounds was tested in animal experiments, after oral and parenteral administration to test animals severely infected with parasites. The dosages used were tolerated very well by the test animals.

The unexpected superiority of the compounds according to the invention, as well as their excellent action, is shown by the examples of Tests A – D (Tables 1 to 4).

EXAMPLE A

Hookworm Test/Dogs

Dogs experimentally infected with *Ancylostoma caninum* were trated after the end of the pre-patent period of the parasites.

The amount of active compound was administered orally, as the pure active compound or dissolved in 10% strength lactic acid, in gelatine capsules.

The degree of action was determined by counting the worms expelled after treatment and the worms remaining in the test animal after dissection, and calculating the percentage of worms expelled.

The active compounds tested, the dosages used, and the action are summarised in the table which follows.

TABLE 1.—HOOKWORM TEST/DOGS

| Active compounds | | Dose, mg./kg. | Action in percent |
|---|---|---|---|
| Known compounds for comparison: | | | |
| $CH_3-CO-NH-C_6H_4-N=CH-N(CH_3)_2 \cdot HCl$ | (17) | 50 | 0 |
| $Cl-C_6H_4-N=C(CH_3)-N(CH_3)_2$ | (18) | 25 | 0 |
| $Cl-C(Cl)=C(Cl)-Cl$ (with additional Cl substituents) | (19) | 300 | 82 |
| $S=C=N-C_6H_4-N=C=S$ | (20) | 50 | 51 |
| $C_6H_5-O-(CH_2)_2-\overset{\oplus}{N}(CH_3)_2-CH_2-C_6H_5$ | (21) | 60 | 46 |
| naphthalene-$CO_2^-$, -OH | | 100 | 65 |
| $H_9C_4$-benzimidazole-NH-C(=O)-OCH$_3$ ** | (22) | 100 / 200 | 77 / 93 |
| benzimidazole-thiazole | (23) | 100 | 0 |
| $H_2N-C_6H_4-N=C(CH_3)-N(CH_3)_2$ | (9) | 5 / 2.5 / 1 | 99 / 99 / 69 |
| $H_2N-C_6H_4-N=C(CH_3)-N(CH_3)_2 \cdot HCl$ | (24) | 10 / 5 / 2.5 / 1 | 94 / 76 / 72 / 17 |
| $H_2N-C_6H_3(Cl)-N=\text{pyrrolidinyl}(CH_3)$ | (25) | 10 / 5 | 92 / 27 |
| $H_2N-C_6H_4-N=\text{pyrrolidinyl}(CH_3)$ | (26) | 25 | 71 |
| $CH_3-NH-C_6H_4-N=C(CH_3)-N(CH_3)_2 \cdot HCl$ | (27) | 25 | 100 |

TABLE 1.—Continued

| Active compounds | Dose, mg./kg. | Action in percent |
|---|---|---|
| Known compounds for comparison: | | |
| H₂N—⟨C₆H₃Cl⟩—N=C(CH₃)—N(CH₃)₂ · HCl  (28) | 10 | 99 |

*Literature: Rawes, D. A. (1961): The activity of Bephenium Hydrocynaphthoate against Hookworms in the Dog Vet. Rec. 73 (16), 390–392.
**Literature: Theodorides, V. J. and M. Laderman (1968): Parbendazole in the Treatment of Intestinal Nematodes of Dogs and Monkeys. Vet. Med. 63 (10), 985.

EXAMPLE B

Hookworm Test/Sheep

Sheep experimentally infected with *Bunostomum trigonocephalum* were treated after the end of the pre-patent period of the parasites.

The amount of active compound was administered orally, as pure active compound, in gelatine capsules.

The degree of action was determined by counting the worms expelled after the treatment and the worms remaining in the test animals, after dissection, and calculating the percentage of worms expelled.

The active compounds tested, the dosages used and the action are shown in the table which follows.

TABLE 2.—HOOKWORM TEST/SHEEP

| Active compounds | | Dose, mg./kg. | Action in percent |
|---|---|---|---|
| H₂N—⟨C₆H₄⟩—N=C(CH₃)—N(CH₃)₂  (9) | Base | 2.5 | 95 |
| | do | 10 | 100 |
| | Hydrochloride | 5 | 100 |
| H₂N—⟨C₆H₃Cl⟩—N=C(CH₃)—N(CH₃)₂  (29) | | 10 | 97 |
| H₂N—⟨C₆H₄⟩—N=⟨pyrrolidinyl-CH₃⟩  (26) | | 23 | 83 |

The active compounds tested, the dosages used and the action are shown in the table which follows.

Table 3:

Test on Worm of Large Intenstine/Sheep

TABLE 3.—TEST ON WORM OF LARGE INTESTINE/SHEEP

| Active compound | Dose, mg./kg. | Action in percent |
|---|---|---|
| H₂N—⟨C₆H₄⟩—N=C(CH₃)—N(CH₃)₂  (9) | 10 | 97 |

EXAMPLE C

Test on worm of Large Intestine/Sheep

Sheep naturally infected with *Chabertia ovina* were treated after the end of the pre-patent period of the parasites.

The amount of active compound was administered orally as pure active compound, in gelatine capsules.

The degree of dilution is determined by counting the worms expelled after the treatment and the worms remaining in the test anmials, after dissection, and calculating the percentage of worms expelled.

EXAMPLE D

Coilworm Test/Dog

Dogs naturally infected with *Toxocara canis* or *Toxascaris leonina* were treated orally. The amount of active compound was administered orally, as pure active compound or as a 10% strength solution in lactic acid, in gelatine capsules.

The degree of action is determined by counting the worms expelled after the treatment and the worms remaining in the test animals, after dissection, and calculating the percentage of worms expelled.

The active compounds tested, dosages used and action are summarised in the table which follows.

Table 4

Coilworm Test/Dog

TABLE 4.—COILWORM TEST/DOG

| Active compounds | | Parasite | Dose, mg./kg | Action in percent |
|---|---|---|---|---|
| $H_2N-\langle\phantom{X}\rangle-N=C(CH_3)-N(CH_3)_2 \cdot HCl$ | (24) | Toxocara | 2.5 | 100 |
| | | Toxascaris | 5.0 | 96 |
| $H_2N-\langle\phantom{X}\rangle(Cl)-N=C(CH_3)-N(CH_3)_2 \cdot HCl$ | (28) | Toxocara | 10.0 | 60 |
| | | Toxascaris | 10.0 | 80 |

In general it has proved advantageous to administer amounts of 0.1 to 50 mg of the new compounds per kg of body weight per day in order to achieve effective results.

Nevertheless it may at times be necessary to deviate from the amounts mentioned, and in particular to do so as a function of the body weight of the test animal or of the nature of the method of administration, but also because of the variety of animal and its individual behaviour towards the medicament or because of the nature of the formulation of the latter and the point in time, or interval, at which it is administered. Thus, it may in some cases suffice to use less than the above-mentioned minimum amount, whilst in other cases the upper limit mentioned must be exceeded. Where major amounts are administered, it may be advisable to divide these into several individual administrations over the course of a day. The same degree range is envisaged for administration in human medicine and in veterinary medicine. The general sense of the other comments made above also applies.

As stated above, the invention also relates to the pharmaceutical us of the new aminophenylamidines and -cycloamidines and their non-toxic salts.

Accordingly, the present invention provides a pharmaceutical composition containing an an active ingredient at least one of the new aminophenylamidines and -cyclo-amidines of the general formula (1) given above, or a non-toxic salt thereof, in admiting with a pharmaceutically acceptable solid or liquid diluent or carrier as hereinafter defined.

In the present specification the expression " pharmaceutically acceptable diluent or carrier" means a non-toxic substance that when mixed with the active ingredient or ingredients renders it suitable for administration. The expression preferably excludes water and low-molecular weight organic solvents commonly used in chemical synthesis, except in the presence of other pharmaceutically necessary ingredients such as salts in correct quantities to render the composition isotonic, buffers, surfactants, colouring and flavouring agents, and preservatives. Examples of suitable liquid and solid diluent and carriers are the following:

Buffered aqueous solution; isotonic saline aqueous solutions; non-toxic organic solvents; such as paraffins, (for example petroleum fractions); vegetable oils (for example groundnut and sesame oils); alcohols, (for example ethyl alcohol or glycerol); glycols (for example propylene glycol or polyethylene glycol); solid excipients, for example, natural ground rock (for example kaolins, aluminas, talc or chalk), synthetic rock powders (for example highly disperse silica or silicates); and sugars(for example unrefined sugar, lactose and glucose). Examples of pharmaceutical compositions according to the invention are ointments, pastes, creams, sprays, lotions, aqueous suspensions, emulsions and solutions, elixirs, syrups, granules and powders, either free-flowing or compressed into tablets.

The compounds and pharmaceutically acceptable salts of the present invention may be administered perorally.

One group of preferred pharmaceutical compositions of the invention are therefore those adapted for oral administration. The diluents and carriers used are preferably therefore those that adapt the active ingredient or ingredients for oral administration. Examples of such diluents and carriers are solid vehicles, excipients and lubricants such as glucose, lactose and sucrose, corn and potato starch, sodium carboxymethyl cellulose, ethyl cellulose and cellulose acetate, powdered gum tragacanth, gelatin, alginic acid, agar, stearic acid, sodium, calcium and magnesium stearates, sodium lauryl sulphate, sodium citrate, calcium carbonate, and dicalcium phosphate.

The pharmaceutical compositions of the invention may also contain other non-toxic adjuvants and modifiers such as dyes, surfactants, for example, emulsifiers, such as non-ionic and anionic emulsifiers (for example polyoxyethylenefatty acid esters, polyoxyethylene-fatty alcohol ethers, alkylsulphonates and arylsulphonates), and dispersing agents (for example lignin, sulphite waste lyes, methylcellulose, starch and polyvinylpyrrolidone), perfumes, flavouring agents, preservatives and biocides.

The compounds and pharmaceutically acceptable salts of the invention may also be administered parenterally, in particular subcutaneously. A group of preferred pharmaceutical compositions of the invention are therefore those adapted for parenteral injection. The diluents and carriers used are therefore preferably those that adapt the active ingredient for parenteral administration. Examples of such diluents and carriers are solvents and suspending diluents such as water and water-miscible organic solvents, in particular sesame oil, groundnut oil, aqueous propylene glycol, N,N'-dimethyl formamide. Examples of pharmaceutical compositions of the invention are sterile isotonic saline aqueous solutions of the active ingredient, which may be buffered solutions of the active ingredient, which may be buffered with a pharmaceutically acceptable buffer and are preferably pyrogen-free.

The pharmaceutical compositions of the invention generally contain 0.5 to 90 wt. % of a new aminophenylamidine or -cycloamidine of the invention or a non-toxic salt thereof.

The present invention also provides medicaments in dosage unit form as thereinafter defined comprising as an active ingredient at least one aminophenylmidine or -cycloamidine of general formula (1) given above or a non-toxic salt thereof, either alone or in admixture with a pharmaceutically acceptable solid or liquid diluent or carrier. In this case the diluent or carrier is preferably as defined above but can also be water or another common solvent.

The expression "medicament in dosage unit form" as used in the present specification means a medicament in the form of discrete portions each containing a unit dose or a multiple or sub-multiple of a unit dose of the active ingredient(s); for example, one, two, three of four unit doses or a half, a third or a quarter of a unit dose. A "unit dose" is the amount of the active ingredient(s) to be administered on one occasion and will usually be a daily dose, or for example a half, a third, or a quarter of a daily dose depending on whether the medicament is to be administered once or, for example, twice, three times, or four times a day.

The disc portions constituting the medicament in dosage unit form can include a protective envelope. The active ingredient can be undiluted and contained in such an envelope, or can be mixed with a pharmaceutically acceptable solid or liquid diluent or carrier as defined above. Such portions can for example be in monolithic coherent form, such as tablets, lozenges, pills, suppositories, or dragees; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

As stated above, it is preferred to administer the new aminophenylamidines and -cycloamidines of general formula (1) or their salts perorally. Preferred medicaments in dosage unit form according to the invention are therefore those adapted for oral administration, such as tablets, pills, dragees, capsules, and cachets, as well as wrapped powders containing the active ingredient in powdered form with a powdered diluent or carrier for suspension in water before being taken.

As stated above it is also possible to administer the new aminophenylamidines and -cycloamidines parenterally. A further group of medicaments in dosage unit form according to the invention are therefore those adapted for parenteral injection, such as ampoules containing a measured quantity of a sterile isotonic saline injectable aqueous solution of the new active ingredient, which may be buffered with a pharmaceutically acceptable buffer and are preferably free of pyrogens.

The preferred unit dose for administration of the medicaments of the invention is 50 – 2,250 mg. of active ingredients. This will normally be administered once daily.

The invention further provides a method of combating parasitic infestation in an aminal which comprises administering to the animal (preferably parenterally or perorally) an aminophenylamidine or -cycloamidine or a non-toxic salt thereof, a pharmaceutical composition or a medicament in dosage unit form according to the invention.

The administration is preferably carried out orally, but may also be carried out parenterally, in particular subcutaneously.

What we claim is
1. A compound of the formula:

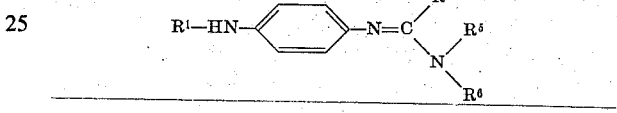

wherein:
$R^1$ is hydrogen, alkyl of 1 to 5 carbon atoms;
R is alkyl of 1 to 5 carbon atoms;
$R^5$ is alkyl of 1 to 4 carbon atoms, alkenyl of 2 to 4 carbon atoms, alkynyl of 2 to 4 carbon atoms, or cycloalkyl of 3 to 6 carbon atoms; and
$R^6$ is hydrogen, alkyl of 1 to 5 carbon atoms or alkenyl of 2 to 5 carbon atoms, or a salt thereof of a pharmaceutically acceptable acid.

2. A compound according to claim 1 wherein $R^1$ is hydrogen or alkyl of 1 to 3 carbon atoms, R is methyl or ethyl, $R^5$ is alkyl of 1 to 3 carbon atoms and $R^6$ is methyl or ethyl.

3. A compound according to claim 1 wherein $R^5$ is alkyl of 1 to 4 carbon atoms.

4. A salt of a compound of claim 1 wherein said salt is selected from the group consisting of a hydrohalide, sulphate, phosphate, nitrate, acetate, naphthalene disulphonate and pamoate.

5. The compound according to claim 1 which is N-(4-aminophenyl)-N',N'-dimethylacetamidine.

6. The compound according to claim 1 which is N-(4-methylaminophenyl)-N',N'-dimethylacetamidine.

* * * * *